Patented May 11, 1937

2,079,763

UNITED STATES PATENT OFFICE 2,079,763

PROCESSES FOR BREAKING PETROLEUM EMULSIONS

Melvin De Groote, St. Louis, and Bernhard Keiser, Webster Groves, Mo., assignors to Tretolite Company, Webster Groves, Mo., a corporation of Missouri No Drawing. Application August 21, 1936, Serial No. 97,218

9 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by our process consists of or comprises blown oils which have been saturated by the action of a non-acidic additive reagent of the kind herein described. The word "non-acidic" is intended to refer to compounds which do not contain or are free from an acidic or ionizable hydrogen atom.

It has long been known that various animal, vegetable and marine oils can be blown or oxidized so as to yield materials which differ in chemical and physical properties and characteristics from the parent materials from which they were derived. The oxidation process is generally conducted by means of moist or dry air, ozone, ozonized air, or a mixture of the same. It may be conducted at atmospheric pressure, or may be conducted under increased pressures of several atmospheres or more. Oxidation may be conducted at relatively low temperatures, for instance, 100° C., or may be conducted at a much higher temperature, such as 175° to 225° C. Oxidation may be conducted in absence of catalysts, or in presence of catalysts. Such catalysts may consist of metallic salts, such as cobalt, or manganese oleate, or may consist of organic material, such as alpha pinene or the like. Oxidation may be conducted in a relatively short time, such as 20 hours, or may require 200 hours, or more.

The blown or oxidized oils employed in demulsification of petroleum emulsions are generally selected from unsaturated oils of the non-drying type, or the semi-drying type, including the marine oils, such as marine mammal oils, etc. They are rarely selected from the active drying oils, such as linseed oil and perilla oil. Although glycerides of saturated acids, such as stearin or palmitin may be oxidized, such blown materials are rarely employed in producing demulsifying agents. Oxidation of the active drying oils, such as linseed oil or perilla oil is generally apt to yield a solid or almost solid product, and as a result, demulsifying agents are rarely produced from such materials alone, but may be produced from a mixture of oils containing some proportion of such active drying oils. In actual practice, blown oils of the kind employed in demulsification of petroleum emulsions are derived from castor oil, rapeseed oil cottonseed oil, peanut oil, corn oil, olive oil, and various marine oils, such as sardine, herring, menhaden, and pilchard oil.

When an unsaturated fatty acid or oil, for instance, olive oil, is blown or oxidized with air, hydroxyl groups are formed at the ethylene linkage. This is particularly true if oxidation is carried out with moist air. It is believed that oxygen is first absorbed so as to saturate the ethylene linkage, and that further reaction takes place with water to produce two hydroxyl groups. Whether or not this is the correct explanation, it is known that hydroxyl groups are formed. For instance, "Chemistry of the Oil Industry", by Southcombe, 1926, page 181, in speaking of blown (oxidized) oils, states as follows:

"Hydroxyl groups are unquestionably formed, as the considerable rise in acetyl value proves."

Patents which describe conventional blown oils or conventional methods of making various blown oils for various purposes (including in some instances, for the purpose of demulsifying crude oils), include the following:

Patent No. 1,929,399, dated October 3, 1933, to Fuchs; Patent No. 1,969,387, dated August 7, 1934, to Tumbler; Patent No. 2,023,979, dated December 10, 1935, to Stehr; Patent No. 2,041,729, dated May 26, 1936, to Seymour, and Patent No. 1,984,633, dated December 18, 1934, to De Groote and Keiser.

Mild oxidation of castor oil (see "Chemical Technology and Analysis of Oils, Fats and Waxes", by Lewkowitsch, 6th Edition, Vol. 2, p. 406) produces relatively small modifications in certain important chemical indices, such as the iodine value, the acetyl value, and the saponification value. If drastic oxidation takes place, either by continued mild oxidation or by more vigorous oxidation at the very beginning of the reaction, as induced by either a higher temperature of reaction, or the presence of a catalyst, such as alpha pinene, manganese ricinoleate, etc., then one obtains an oxidized oil having characteristics which clearly indicate that drastic oxidation has taken place. These indices of drastic oxidation are a relatively low iodine value, such as 65 or less, and may be as low as 40 or thereabouts; an acetyl value of approximately 160 to 200; an increased viscosity; or specific gravity of almost 1, or even a trifle over 1 at times; and in absence of other coloring matter, a deep orange color.

Drastically oxidized castor oil can be prepared by well known methods, or such products can be purchased on the open market under various trade names, such as "blown castor oil", "bodied castor oil", "blended castor oil", "blended bodied castor oil", "processed castor oil", "oxidized castor oil", "heavy castor oil", "viscous castor oil", etc. These various names appear to be applied to drastically oxidized castor oils which are different in degree but not different in kind.

In preparing the material used as the demulsifying agent in our process, we prefer to use drastically oxidized castor oil having the following characteristics:

| | |
|---|---|
| Acid number | 15.1 |
| Saponification number | 230.5 |
| Iodine number | 53.5 |
| Acetyl number | 164.0 |
| Hydroxyl value | 188.0 |
| Percent unsaponifiable matter | 1.1 |
| Percent nitrogen | 0.0 |
| Percent $SO_3$ | 0.0 |
| Percent ash | Trace |

One of the peculiar things about blown oils is that gaseous oxidation, regardless of how drastic or how long it may be continued, only reduces unsaturation as measured by the analytical iodine number to approximately half the original value, or one-half the normal iodine value, based on a single ethylene linkage. For instance, if castor oil or rapeseed oil or American sardine oil is blown by any of the conventional processes, oxidation appears to stop when the iodine number drops to a value of approximately 40 to 45. Previous reference has been made to a blown castor oil, which is used as a raw material in preparing our preferred reagent. This particular oil has an iodine value of 53. It is not necessary that oxidation or blowing, lower the iodine value to the lowest limit prior to saturation in the manner hereinafter described. In the subsequent discussion reference will be made to blown castor oil for purposes of illustration only, as we wish it to be understood that the same procedure can be applied to other blown oils of the kind previously mentioned, so as to produce effective demulsifying agents.

We have found that if blown castor oil of the kind previously described, having an iodine number of 53 to 58 or thereabouts, is treated with any non-acidic additive reagent, such as sulfur, sulfur chloride, chlorine, bromine, etc., that the product obtained by such saturation of the blown oil is, in many instances, a more effective demulsifying agent than the blown oil previous to such treatment. The above reagents are of the kind which ordinarily saturate the ethylene linkage in a fatty hydrocarbon chain. The expression "saturation" is employed to mean the reduction of the iodine value without necessarily meaning that this is limited to reactions of the kind which are involved in the elimination of the ethylene linkage.

It has long been known that unsaturated oils or fats can be "sulfurized" by the action of sulfur or sulfur chlorides of various compositions. The expression "sulfurized" is herein employed to mean such treatment and not in any other sense, such as the sense of sulfation or sulfonation. Similarly, it is known that various oils can be treated with halogens, such as chlorine, bromine, etc., so as to reduce the unsaturation of the fatty material, as measured by the iodine number. Reference is made to "Chemical Technology and Analysis of Oils, Fats and Waxes", Lewkowitsch, 6th Edition, Vol. 1, p. 60, et seq. (1921).

It is obvious, of course, that the expression "additive reagents" is not intended to include the gaseous oxidizing reagents employed in producing blown oils, such as air, ozone, ozonized air, etc. Furthermore, it is known that materials such as aldehydes combine with ammonia or even with amines to give new compounds. Some blown oils may contain a greater or lesser percentage of aldehydic acids or the like, and presumably the aldehyde radicals of such aldehydic acids could react with ammonia or ammonium compounds. Such reaction, of course, does not involve the ethylene linkage. For this reason, ammonia and ammonium compounds, such as amines, are not intended to be included in the scope of the expression "additive reagents" herein used.

Our preferred reagent is prepared by the use of chlorine in preference to such materials as sulfur, bromine, etc. The particular reagent selected to reduce the unsaturation depends on its cost, ease of combination, one's ability to control the reactions, effectiveness of the resultant product, etc. We prefer to use a blown castor oil of the kind previously specified and mix the same with any suitable solvent, such as chloroform, and then subject the mixture to partial or complete chlorination until the unsaturation measured by the iodine number has dropped to approximately 20 or less, and preferably, to a value of 10 or thereabouts. In many instances it is desirable, in course of demulsification, to use the saturated blown oil admixed with a solvent, and for such reason the solvent present during halogenation or sulfurization, for example, may be permitted to remain as part of the final demulsifying agent. Thus, our preferred reagent may be made by mixing approximately 1,000 lbs. of blown castor oil of the kind previously described with approximately 1,000 lbs. of carbon tetrachloride and slowly bubbling chlorine through the mass until the iodine value calculated on the carbon tetrachloride-free basis is approximately 10 to 20. The reaction is then stopped, and the mixture with the carbon tetrachloride present used as the demulsifying agent. Halogenization may be conducted without a solvent present. Treatment with sulfur may be conducted, if desired, without an added solvent, although the most advantageous method of treatment appears to be by means of sulfur chloride in presence of a solvent, or else, by first dissolving elemental sulfur in carbon bisulfide and then mixing said solution with the blown oil selected, then permitting the carbon bisulfide to evaporate and then heating the blown oil with the sulfur present to such a temperature that reaction takes place and the unsaturation, as measured by the iodine number, has been reduced to a value of 10 to 20 or thereabouts.

In some instances, the material obtained by the saturation process may show some acidity, due perhaps, to the acidity of the blown oil prior to saturation. The product may be used without removal of the acidity, if present. If desired, such acidity can be neutralized by use of the conventional bases, such as caustic soda, caustic potash and ammonia, but is preferably removed by means of an amine, such as triethanolamine, mono-ethanolamine, amylamine, benzylamine, piperidine, etc.

In the claims the expression "blown oil saturated by means of a non-acidic additive reagent" is used in its broadest sense to include the product, or products, in which all or part of the residual acidic hydrogen, if present, has been neutralized by one or more of the suitable bases previously mentioned, or in any equivalent manner. The acidic hydrogen can also be removed by esterification by mixing the product with an alcohol, such as ethyl alcohol, propyl alcohol, glycerol, ethylene glycol, and the like, and subjecting the mixture to conventional esterification processes, such as passing through dry hydrochloric acid gas at a temperature above the boiling point of water.

It is known that the ethylene linkage of unsaturated fatty materials can be reduced or eliminated by the addition of sulfuric acid and the like. It is to be understood that in preparing the demulsifying agent employed in our process we use a non-acidic reagent, so as to reduce the unsaturation indicated by the iodine value or number. The expression "non-acidic", as employed, excludes sulfuric acid and the like as a suitable reagent for reducing the unsaturation.

In the manufacture of the demulsifying agent used in the present process the substance that is used as the raw material is conventional blown oil. It is well known, of course, that fatty acids, for instance, oleic acid, ricinoleic acid, etc., may be blown or oxidized in the same manner that olive oil or castor oil is oxidized. Such materials are different, of course, from the oxidized blown oils themselves, but are of value in demulsification of crude oil. Such oxidized or blown fatty acids may be subjected to the same sort of treatment as has been described for the blown oils, so as to produce a demulsifying agent suitable for use in our process.

Similarly, the estolides of blown oils can be obtained by subjecting the blown oils to an acid saponification (hydrolysis) or hydrolytic cleavage by contact with dilute mineral acid, as is customary in the Twitchell process, or the modification of Twitchell process, in which a petroleum sulfonic acid (Petroff reagent) is employed. The oxidized or blown oils, being hydroxy acids, polymerize during such hydrolytic process and polymerize more readily if they are heated to approximately 115° C. after the completion of the hydrolytic process. Such materials are referred to as blown oil estolides, and their manufacture is described in detail in our co-pending application for patent Serial No. 97,217, filed August 21, 1936. Such estolides may be subjected to the same sort of chemical treatment as has been described for the blown oils, to produce a satisfactory demulsifying agent.

In order that we may employ a comprehensive term which will include not only blown oils but oxidized or blown fatty acids and oxidized or blown estolides, we have employed the expression "blown oil body" in the claims as a broad generic term intended to include within its scope all three of these classes of materials. The blown oils themselves, as differentiated from the blown or oxidized fatty acids and as differentiated from the blown or oxidized estolides, will be referred to simply as "blown oil".

Conventional demulsifying agents employed in the treatment of oil field emulsions are used as such, or after dilution with any suitable solvent, such as water, petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the dimulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, and the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent in our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately one part of treating agent to 500 parts of emulsion, up to one part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsion, i. e., emulsions that will yield readily to the action of chemical demulsifying agents, the ratio of 1:30,000, above referred to, may be sufficient to produce highly satisfactory results. In general, we have found that for an average petroleum emulsion a ratio of 1 part of treating agent to 5,000 or 10,000 parts of emulsion will usually be found to produce commercially satisfactory results.

Having thus described our invention, what we claim as new and desire to secure by Letters Patent is:

1. A process for breaking petroleum emulsions of the water-in-oil type, which consists in subjecting the emulsion to the action of a demulsifying agent comprising a blown oil body which has been treated with a non-acidic additive reagent, free from gaseous oxygen.

2. A process for breaking petroleum emulsions of the water-in-oil type, which consists in subjecting the emulsion to the action of a demulsifying agent comprising a blown oil which has been treated with a non-acidic additive reagent, free from gaseous oxygen.

3. A process for breaking petroleum emulsions of the water-in-oil type, which consists in subjecting the emulsion to the action of a demulsifying agent comprising a blown rapeseed oil, which has been treated with a non-acidic additive reagent, free from gaseous oxygen.

4. A process for breaking petroleum emulsions of the water-in-oil type, which consists in subjecting the emulsion to the action of a demulsifying agent comprising a blown marine oil which has been treated with a non-acidic additive reagent, free from gaseous oxygen.

5. A process for breaking petroleum emulsions of the water-in-oil type, which consists in subjecting the emulsion to the action of a demulsifying agent comprising a blown castor oil saturated by means of a non-acidic additive reagent, free from gaseous oxygen.

6. A process for breaking petroleum emulsions of the water-in-oil type, which consists in subjecting the emulsion to the action of a demulsifying agent comprising a blown castor oil saturated by means of a halogen.

7. A process for breaking petroleum emulsions of the water-in-oil type, which consists in subjecting the emulsion to the action of a demulsifying agent comprising a blown castor oil saturated by means of a halogen so as to have an iodine number of less than 20.

8. A process for breaking petroleum emulsions of the water-in-oil type, which consists in subjecting the emulsion to the action of a demulsifying agent comprising a blown castor oil saturated by means of chlorine so as to have an iodine number of less than 20.

9. A process for breaking petroleum emulsions of the water-in-oil type, which consists in subjecting the emulsion to the action of a demulsifying agent comprising a blown castor oil saturated by means of chlorine so as to have an iodine number of less than 20, admixed with a suitable solvent.

MELVIN DE GROOTE.
BERNHARD KEISER.